(12) United States Patent
Kishida et al.

(10) Patent No.: US 8,179,303 B2
(45) Date of Patent: May 15, 2012

(54) SIGNAL PROCESSING APPARATUS, RADAR APPARATUS, AND SIGNAL PROCESSING METHOD

(75) Inventors: Masayuki Kishida, Kobe (JP); Hisateru Asanuma, Kobe (JP); Tomoya Kawasaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 302 days.

(21) Appl. No.: 12/536,112

(22) Filed: Aug. 5, 2009

(65) Prior Publication Data

US 2010/0033365 A1   Feb. 11, 2010

(30) Foreign Application Priority Data

Aug. 5, 2008   (JP) ................................. 2008-201379

(51) Int. Cl.
*G01S 13/93* (2006.01)
*G01S 13/42* (2006.01)
(52) U.S. Cl. ............ 342/70; 342/71; 342/107; 342/111; 342/115; 342/116; 342/133; 342/139; 342/146; 342/196
(58) Field of Classification Search ............... 342/70–72, 342/107, 111, 115, 116, 133, 139, 146, 192, 342/196; 340/435, 436, 903; 701/301
See application file for complete search history.

(56) References Cited

U.S. PATENT DOCUMENTS

| | | | | |
|---|---|---|---|---|
| 5,731,778 A | * | 3/1998 | Nakatani et al. | 342/70 |
| 5,751,240 A | * | 5/1998 | Fujita et al. | 342/70 |
| 6,753,805 B2 | * | 6/2004 | Nakanishi et al. | 342/128 |
| 6,788,247 B2 | * | 9/2004 | Mitsumoto et al. | 342/109 |
| 6,888,494 B2 | * | 5/2005 | Tamatsu et al. | 342/128 |
| 6,999,024 B2 | * | 2/2006 | Kumon et al. | 342/70 |
| 7,339,517 B2 | * | 3/2008 | Nakanishi | 342/70 |
| 7,495,604 B2 | * | 2/2009 | Yamano et al. | 342/107 |
| 7,532,154 B2 | * | 5/2009 | Noda | 342/107 |
| 7,663,537 B2 | * | 2/2010 | Suzuki et al. | 342/133 |
| 7,675,457 B2 | * | 3/2010 | Nakanishi | 342/133 |

(Continued)

FOREIGN PATENT DOCUMENTS

DE   696 11 278 T2   5/2001

(Continued)

OTHER PUBLICATIONS

Office Action issued on Jun. 14, 2011 in the corresponding Japanese Applicaton No. 2008-201379 (with Partial English Translation).

(Continued)

*Primary Examiner* — John B Sotomayor
(74) *Attorney, Agent, or Firm* — Oblon, Spivak, McClelland, Maier & Neustadt, L.L.P.

(57) ABSTRACT

A signal processing apparatus for a radar transceiver, which receives a reflected signal generated by a target object in response to a frequency modulated transmission signal, and generates a beat signal having a frequency difference between the transmission signal and a reception signal, includes: an azimuth angle detection unit that detects an azimuth angle of the target object on the basis of a peak signal in a frequency spectrum of the beat signal; a peak signal extraction unit that prioritizes extraction of a peak signal corresponding to a predetermined azimuth angle range and a predetermined relative distance range of the target object; and a target object detection unit that detects the target object from the extracted peak signal.

20 Claims, 12 Drawing Sheets

U.S. PATENT DOCUMENTS

| | | | |
|---|---|---|---|
| 7,692,574 B2 * | 4/2010 | Nakagawa | 342/107 |
| 7,812,759 B2 * | 10/2010 | Kai | 342/107 |
| 2003/0112173 A1 * | 6/2003 | Seki et al. | 342/70 |
| 2004/0183719 A1 * | 9/2004 | Natsume et al. | 342/147 |
| 2006/0007036 A1 * | 1/2006 | Natsume et al. | 342/70 |
| 2008/0088500 A1 * | 4/2008 | Ishii et al. | 342/109 |
| 2009/0207068 A1 * | 8/2009 | Inaba | 342/70 |
| 2010/0271257 A1 * | 10/2010 | Hirogari et al. | 342/107 |

FOREIGN PATENT DOCUMENTS

| | | |
|---|---|---|
| DE | 10 2004 024 125 A1 | 1/2005 |
| JP | 11-237471 | 8/1999 |
| JP | 11-271433 | 10/1999 |
| JP | 2001-228241 | 8/2001 |
| JP | 2002-341021 | 11/2002 |
| JP | 2003-267084 | 9/2003 |
| JP | 2004-226121 | 8/2004 |
| JP | 2004-233085 | 8/2004 |
| JP | 2006-189432 | 7/2006 |
| JP | 2008-74353 | 4/2008 |

OTHER PUBLICATIONS

Office Action issued Mar. 2, 2012, in German Patent Application No. 10 2009 028 232.7 filed Aug. 4, 2009.

* cited by examiner

SIGNAL PROCESSING APPARATUS, RADAR APPARATUS, AND SIGNAL PROCESSING METHOD

CROSS REFERENCE TO RELATED APPLICATIONS

This application claims priority under 35 U.S.C. §119 to Japanese Patent Application No. 2008-201379, filed on Aug. 5, 2008, the entire contents of which are incorporated herein by reference.

BACKGROUND OF THE INVENTION

1. Field of the Invention

The invention relates to a signal processing apparatus and so on for a radar transceiver, which receives a reflected signal generated by a target object in response to a frequency modulated transmission signal and generates a beat signal having a frequency difference between the transmission signal and a reception signal, and more particularly to a signal processing apparatus and so on that detects a target object on the basis of a peak signal in a frequency spectrum of the beat signal.

2. Description of the Related Art

In recent years, Frequency Modulated-Continuous Wave (FM-CW) type radar apparatuses have been installed for use in vehicles as obstruction detecting means used during vehicle collision avoidance/collision response control. Japanese Patent Application Publication No. 11-271433 (JP-A-11-271433) describes an example of a vehicle-installed FM-CW type radar apparatus.

A vehicle-installed FM-CW type radar apparatus implements frequency modulation on a millimeter wavelength continuous wave (electromagnetic wave) in accordance with a triangular wave-shaped frequency modulation signal, transmits the result to a search area, and receives a reflected signal generated by a target object. At this time, a frequency of the reflected signal shifts due to the effects of a time delay corresponding to a relative distance of the target object and a Doppler shift corresponding to a relative velocity of the target object, and therefore a frequency difference occurs between the transmission and reception signals. To detect the frequency difference, the radar apparatus mixes the transmission and reception signals, thereby generating a beat signal having a frequency (beat frequency) that corresponds to the frequency difference between the signals.

When a plurality of target objects having different relative distances or different relative velocities exist in the search area, a reflected signal having a different frequency is included in the reception signal for each target object. Therefore, in a frequency spectrum obtained by subjecting the beat signal to Fast Fourier Transform (FFT) processing, a maximum value is formed at a different frequency for each target object. Hereafter, a beat signal forming a maximum value will be referred to as a peak signal, and a beat frequency thereof will be referred to as a peak frequency.

The radar apparatus detects an azimuth angle, the relative distance, and the relative velocity of each target object using a phase and the peak frequency of the peak signal, and outputs a detection result to a vehicle control apparatus that controls the behavior of the vehicle. The vehicle control apparatus then determines a collision probability on the basis of the relative velocity, relative distance, or azimuth angle of the plurality of detected target objects, and when a collision is anticipated, the vehicle control apparatus drives various actuators for performing a collision avoidance operation or a passenger protection operation.

Here, the number of target objects for which the collision probability can be determined by the vehicle control apparatus within a limited amount of time is limited by the throughput of the vehicle control apparatus. Therefore, when a plurality of peak signals are detected, the radar apparatus outputs a detection result relating to an important target object in terms of vehicle control to the vehicle control apparatus preferentially, rather than outputting the detection results relating to all of the peak signals. For this purpose, the radar apparatus extracts a peak signal representing this target object preferentially after detecting a number of peak signals corresponding to the number of target objects from the beat signal, and detects the target object on the basis of the extracted peak signal.

In the case of a radar apparatus that monitors the front of the vehicle, a target object having a high collision probability, or in other words a target object positioned at a short distance from a front surface of the vehicle, is considered to be an important target object. Various methods of extracting the peak signal that represents this target object have been proposed.

A first method focuses on the fact that, according to an antenna pattern of the radar apparatus, a reflected signal from the front surface of the vehicle has a maximum level, and therefore a peak signal having a large level is extracted preferentially. A second method focuses on the fact that the peak frequency decreases as the relative distance of the target object decreases, and therefore a peak signal having a low peak frequency is extracted preferentially.

However, the methods described above exhibit the following problems.

FIG. 1 is a view illustrating positional relationships between a radar apparatus and target objects, and the condition of peak signals respectively representing the target objects. For ease of description, a case in which one peak signal is extracted preferentially from peak signals representing two target objects is used here as an example.

Figure 1A:
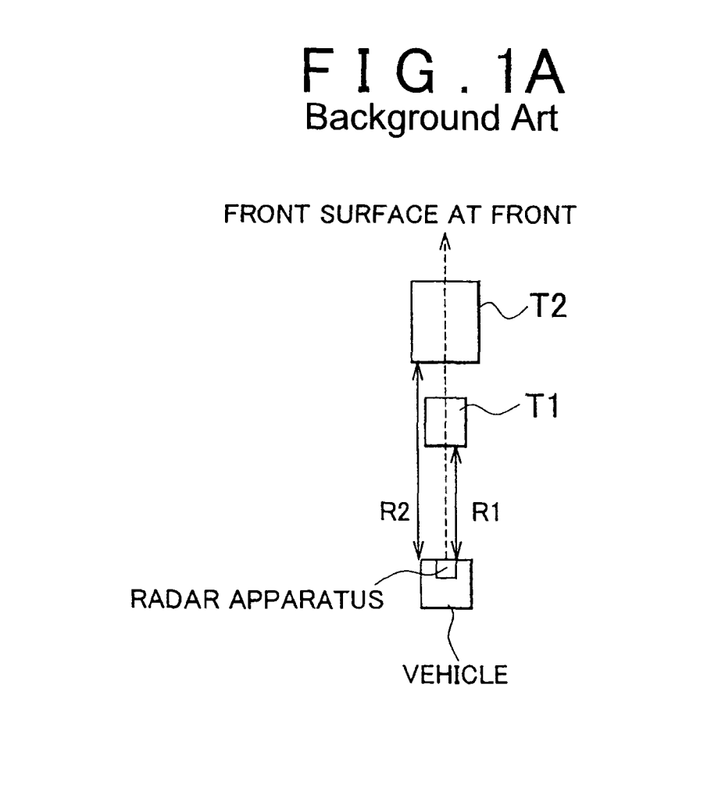
FIGS. 1A to 1D are views showing positional relationships between a radar apparatus and target objects, and the condition of peak signals respectively representing the target objects.
Figure 1B:
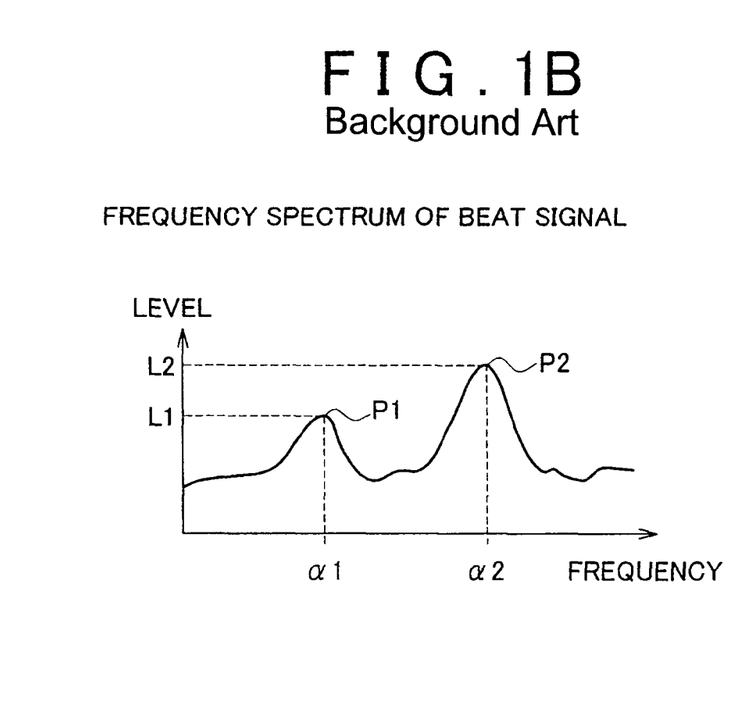

First, as shown in FIG. 1A, when a target object T1 (a passenger vehicle, for example) is positioned at a short distance from the front surface of the radar apparatus and a target object T2 (a large truck, for example) having a larger reflection sectional area is positioned in front of the target object T1, peak signals representing the target objects T1, T2 are as shown in FIG. 1B. Here, considering the importance in terms of vehicle control, the target object T1 should be extracted preferentially, but when the method of extracting the peak signal having the largest level preferentially is employed, a level L2 of a peak signal P2 representing the target object T2 having the larger reflection sectional area exceeds a level L1 of a peak signal P1 representing the target object T1, and therefore the peak signal P2 representing the target object T2 is extracted preferentially.

Figure 1C:
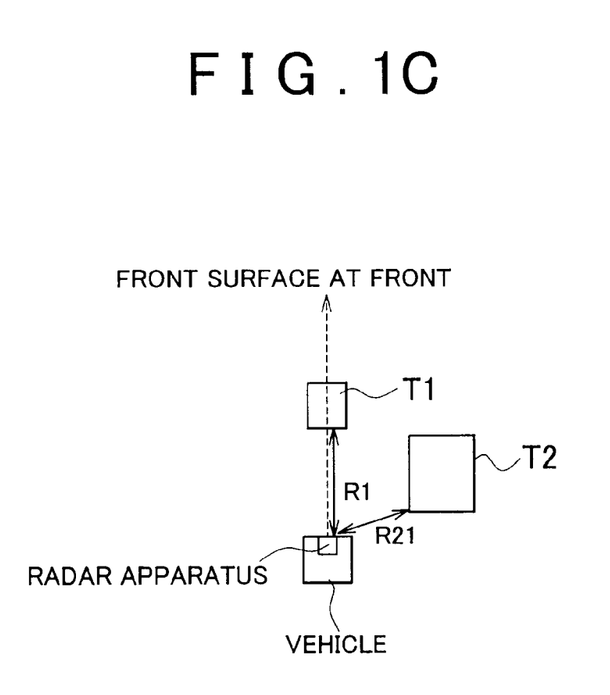
Figure 1D:
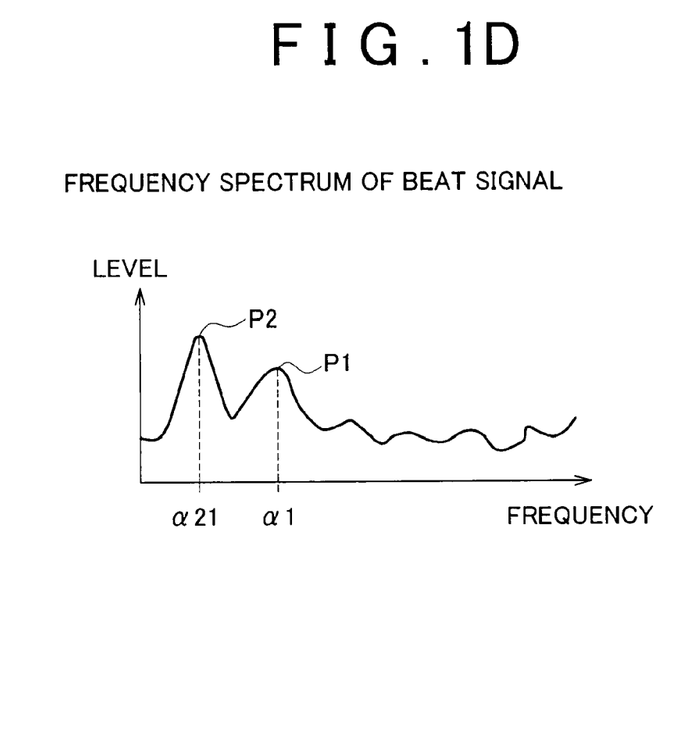

According to the method of extracting the peak signal having the lowest peak frequency preferentially, a relative distance RI of the target object T1 is smaller than a relative distance R2 of the target object T2, and therefore a peak frequency $\alpha 1$ of the peak signal P1 is lower than a frequency $\alpha 2$ of the peak signal P2. Hence, the peak signal P1 is extracted preferentially. As shown in FIG. 1C, however, when the target object T2 is positioned extremely close, for example in the adjacent lane, a relative distance R21 of the target object T2 becomes smaller than the relative distance R1 of the target object T1. In this case, as shown in FIG. 1D, a frequency $\alpha 21$ of the peak signal P2 is lower than the frequency $\alpha 1$ of the peak signal P1, and therefore the peak signal P2 is extracted preferentially.

Hence, with the methods described above, the peak signal representing the target object that has a high level of importance in terms of vehicle control and is positioned in front of the vehicle at a short distance from the front surface of the vehicle may not be extracted, and as a result, the corresponding target object may not be detected.

SUMMARY OF THE INVENTION

The invention provides a signal processing apparatus and so on for prioritizing extraction of a peak signal representing an important target object in terms of vehicle control with a high degree of accuracy.

A first aspect of the invention relates to a signal processing apparatus for a radar transceiver. This apparatus is a signal processing apparatus for a radar transceiver which receives a reflected signal generated by a target object in response to a frequency modulated transmission signal, and generates a beat signal having a frequency difference between the transmission signal and a reception signal. The apparatus includes: an azimuth angle detection unit that detects an azimuth angle of the target object on the basis of a peak signal in a frequency spectrum of the beat signal; a peak signal extraction unit that prioritizes extraction of a peak signal corresponding to a predetermined azimuth angle range and a predetermined relative distance range of the target object; and a target object detection unit that detects the target object from the extracted peak signal.

With the signal processing apparatus according to this aspect, the peak signal extraction unit prioritizes extraction of a peak signal corresponding to the predetermined azimuth angle range and the predetermined relative distance range, and therefore a peak signal representing a target object located within an azimuth angle range and a relative distance range having a high level of importance in terms of vehicle control can be detected without exception.

A second aspect of the invention relates to a signal processing method. This signal processing method is a signal processing method for processing a beat signal which is generated in a radar transceiver that receives a reflected signal generated by a target object in response to a frequency modulated transmission signal, and which has a frequency difference between the transmission signal and a reception signal. The signal processing method executes: detecting an azimuth angle of the target object on the basis of a peak signal in a frequency spectrum of the beat signal; prioritizing extraction of a peak signal corresponding to a predetermined azimuth angle range and a predetermined relative distance range of the target object; and detecting the target object from the extracted peak signal.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Figure 2:
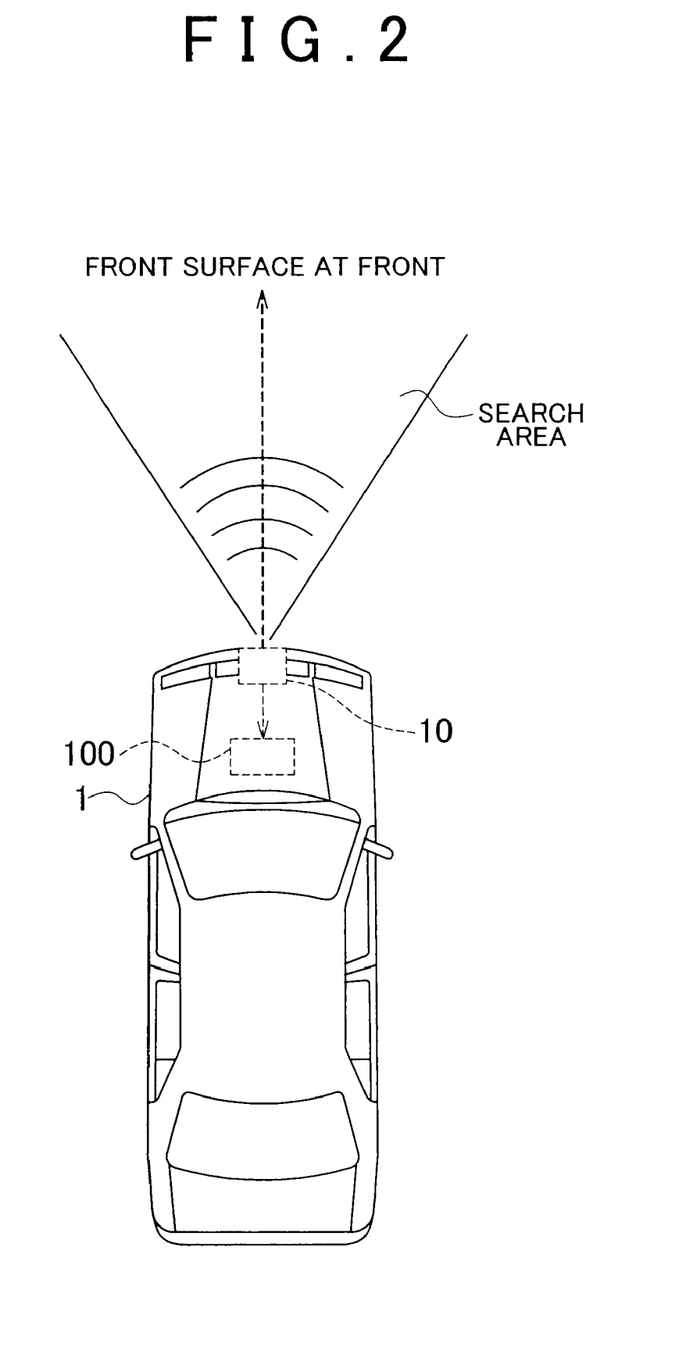
FIG. 2 is a view illustrating a usage of a radar apparatus according to an embodiment of the invention.

FIG. 2 is a view illustrating a usage of a radar apparatus according to an embodiment of the invention. An FM-CW type radar apparatus 10 is installed in a front grill or a bumper on a front portion of a vehicle 1, for example, in order to transmit a radar signal (electromagnetic wave) to a search area located in front of the vehicle 1 through a radome formed on a front surface of the front grill or bumper and receive a reflected signal from the search area.

The radar apparatus 10 then generates a beat signal from the transmission and reception signals and processes the generated beat signal using a signal processing apparatus such as a microcomputer to detect an azimuth angle, a relative distance, and a relative velocity of a target object located within the search area. The target object may be a preceding vehicle of the vehicle 1, an opposing vehicle, a pedestrian, and so on, for example. On the basis of a detection result, a vehicle control apparatus 100 determines the probability of a collision with the target object, and when a collision is anticipated, the vehicle control apparatus 100 avoids the collision by driving various actuators of the vehicle 1 to control the behavior of the vehicle 1, or activates a warning apparatus that issues a warning to the passengers or a safety apparatus that protects the passengers.

Figure 3A:
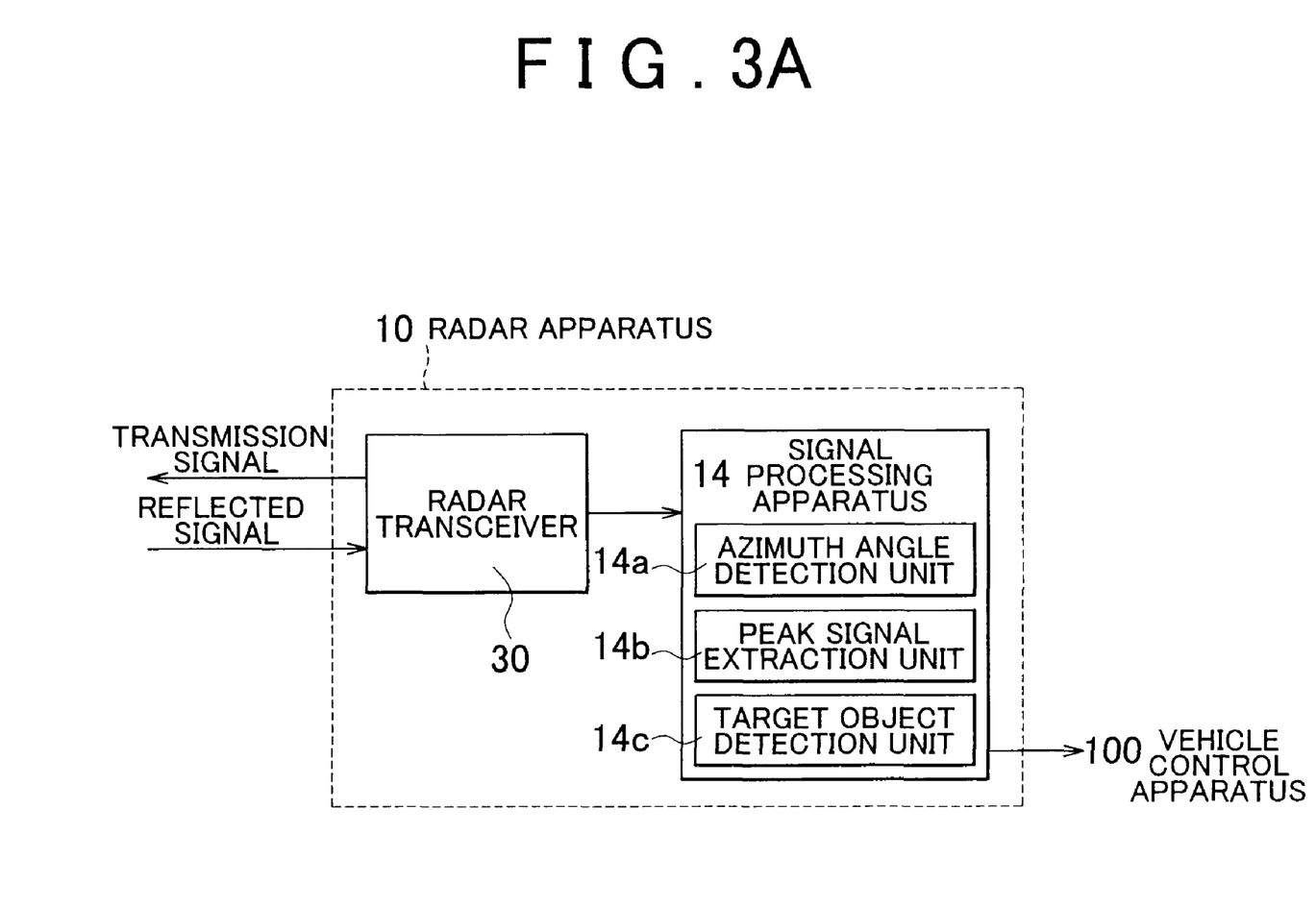
FIGS. 3A to 3C are views illustrating the constitution of the radar apparatus according to this embodiment.

FIG. 3 is a view illustrating the constitution of the radar apparatus according to this embodiment. In FIG. 3A, which shows the overall constitution of the radar apparatus, the FM-CW type radar apparatus 10 includes a radar transceiver 30 that transmits a frequency modulated millimeter wavelength continuous wave (electromagnetic wave) as the transmission signal, receives a reflected signal thereof, and generates a beat signal having a frequency corresponding to a frequency difference between the transmission and reception signals, and a signal processing apparatus 14 that processes the beat signal generated by the radar transceiver 30.

Figure 4A:
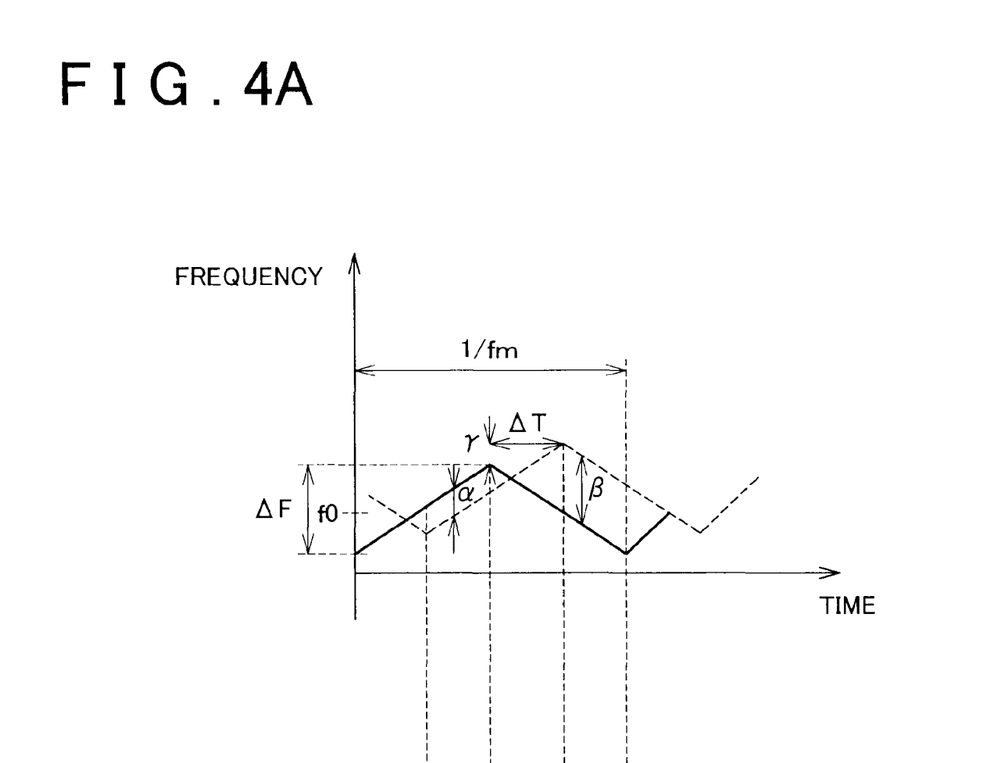
FIGS. 4A and 4B are views illustrating frequency variation in a transmission signal and a reception signal.
Figure 4B:
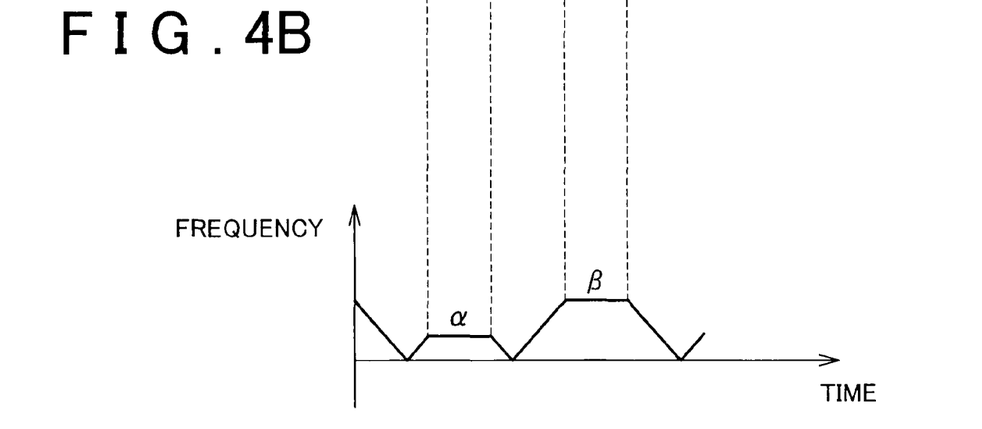

According to FIG. 4A, which shows frequency variation in the transmission signal and reception signal, the frequency of the transmission signal rises and falls linearly with a center frequency f0 (76.5 GHz, for example) and a frequency modulation width $\Delta F$ (200 MHz, for example) in accordance with a triangular wave-shaped frequency modulation signal having a frequency fm (400 Hz, for example), as shown by a solid line. In contrast, the reception signal is subject to a time delay $\Delta T$ corresponding to the relative distance of the target object that reflects the signal and a frequency shift of a Doppler frequency $\gamma$ corresponding to the relative velocity of the reflected target object, as shown by a broken line. As a result, a frequency difference α and a frequency difference β are generated between the transmission and reception signals in a frequency rise period (up period) and a frequency fall period (down period) of the transmission signal, respectively. Therefore, as shown in FIG. 4B, a beat frequency of a beat signal having a frequency that corresponds to the frequency difference between the signals corresponds to a beat frequency α in the up period and a beat frequency β in the down period. A relationship expressed by the following equations (1) and (2) is established between the frequencies α and β and the relative distance R and relative velocity V of the target object. Note that here, C denotes the speed of light.

$$R = C \times (\alpha + \beta)/(8 \times \Delta F \times fm) \quad (1)$$

$$V = C \times (\beta - \alpha)/(4 \times f0) \quad (2)$$

Returning to FIG. 3A, the radar transceiver 30 scans the search area by varying the directivity of the transmission signal or the reception signal using a mechanical scanning method or an electronic scanning method.

Figure 3B:
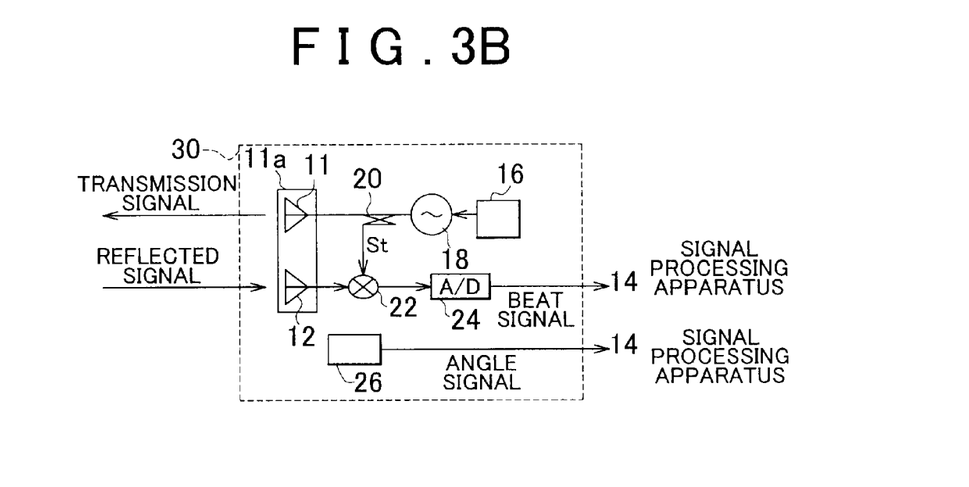

FIG. 3B shows the constitution of the radar transceiver 30 when a mechanical scanning method is employed. When a frequency modulation instruction unit 16 generates a triangular wave-shaped frequency modulation signal in the radar transceiver 30, a voltage-controlled oscillator (VCO) 18 outputs a transmission signal having a frequency that rises linearly in a rise section of the triangular wave and falls linearly in a fall section of the triangular wave in accordance with the frequency modulation signal, as shown in FIG. 4A. The transmission signal is subjected to power distribution by a distributor 20, whereupon a part thereof is transmitted from a transmission antenna 11. A reflected signal is then received by a reception antenna 12, whereupon the reception signal is input into a mixer 22. The mixer 22 mixes the reception signal with a part of the power-distributed transmission signal to generate a beat signal having a frequency corresponding to the frequency difference between the two. The beat signal is then turned into digital data by an analog-digital (AD) converter 24 and output to the signal processing apparatus 14.

The radar transceiver 30 further includes a rotation unit 26 having a mechanism that reciprocally rotates an antenna unit 11a including the transmission antenna 11 and the reception antenna 12 and an encoder that detects a rotation angle of the antenna unit 11a. An angle signal indicating the rotation angle of the antenna unit 11a is output to the signal processing apparatus 14 from the encoder of the rotation unit 26. On the basis of the angle signal, the signal processing apparatus 14 detects the angle of the antenna unit 11a upon reception of the reception signal, and thereby detects the azimuth angle of the target object. Further, in this case, the signal processing apparatus 14 performs target object detection using a period required for the antenna unit 11a to scan the search area once by performing a single rotation to one side within an angle range corresponding to the search area as a single detection cycle.

Figure 3C:
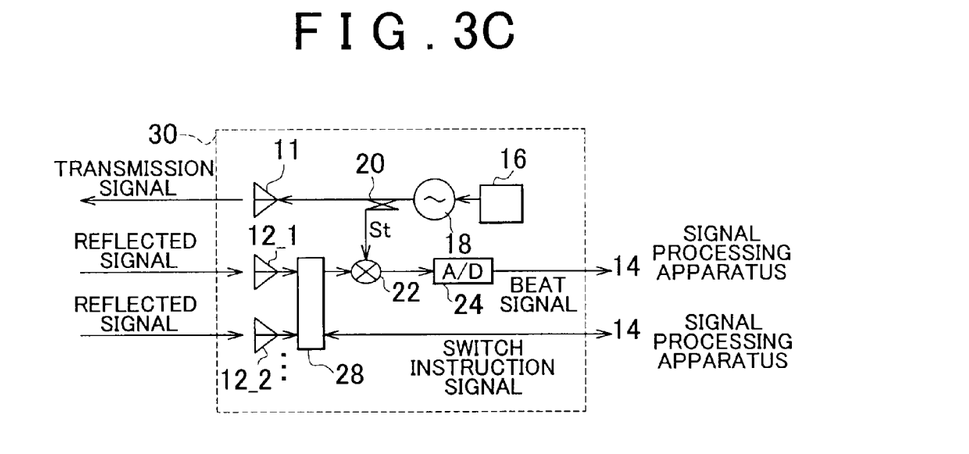

FIG. 3C shows the constitution of the radar transceiver 30 when an electronic scanning method is employed. The radar transceiver 30 includes a plurality of reception antennas 12_1, 12_2, . . . disposed at predetermined intervals to receive reception signals. The radar transceiver 30 also includes a switch circuit 28 that inputs the reception signals received by the reception antennas 12_1, 12_2, . . . into the mixer 22 through time division in accordance with a switch instruction signal from the signal processing apparatus 14. The mixer 22 generates a beat signal by mixing the reception signals received by the respective reception antennas 12_1, 12_2, . . . with the transmission signal.

In this case, the signal processing apparatus 14 determines an overall antenna directivity when a gain of the reception signal reaches a maximum, and detects the azimuth angle of the target object corresponding to the directivity. More specifically, the signal processing apparatus 14 determines a phase difference when a composite amplitude of the beat signal reaches a maximum by controlling the phase difference of the beat signal between the reception antennas 12_1, 12_2, . . . , and detects an azimuth angle corresponding to the phase difference.

Alternatively, in a phase monopulse method, which is one aspect of an electronic scanning method, the signal processing apparatus 14 detects the azimuth angle of the target object, i.e. an incoming direction of the reception signal, directly from a reception phase difference between the antennas, or in other words the phase difference of the beat signals between the antennas. In this electronic scanning method, the signal processing apparatus 14 performs the target object detection processing using the up period and down period of the transmission signal as a single detection cycle.

Returning to FIG. 3A, the constitution of the signal processing apparatus 14 will be described. The signal processing apparatus 14 includes a calculation processing device such as a Digital Signal Processor (DSP) that implements FFF processing on the digitized beat signal to detect the frequency spectrum thereof, and a microcomputer that processes the frequency spectrum of the beat signal to detect the position and so on of the target object. The microcomputer includes a Central Processing Unit (CPU), a Read Only Memory (ROM) storing various processing programs and control programs executed by the CPU, and a Random Access Memory (RAM) in which the CPU stores various data temporarily. Accordingly, an azimuth angle detection unit 14a that detects the azimuth angle of the target object on the basis of a peak signal in the frequency spectrum of the beat signal using the mechanical scanning method or the electronic scanning method described above, a peak signal extraction unit 14b that extracts a peak signal corresponding to a predetermined azimuth angle range and a predetermined relative distance range preferentially, and a target object detection unit 14c that detects the target object from the peak signal are constituted by programs determining respective processing procedures and the CPU that executes the programs.

Figure 5:
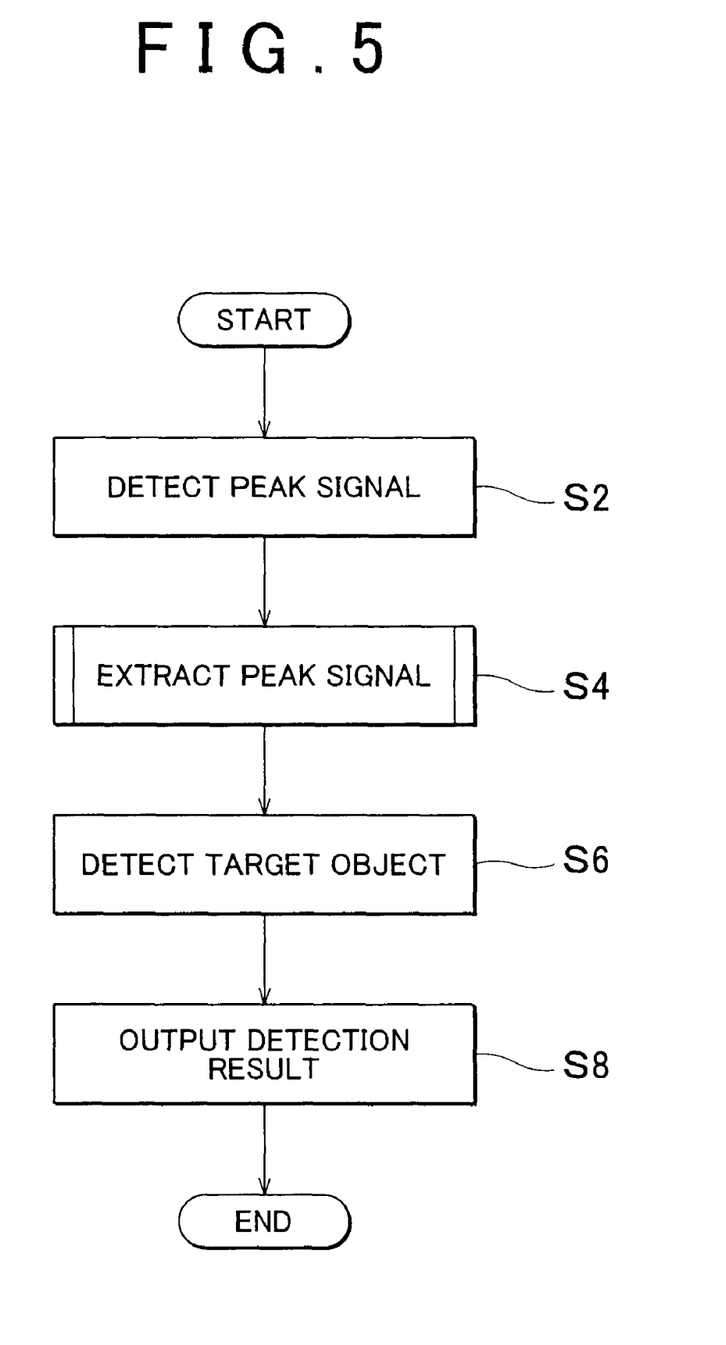
FIG. 5 is a flowchart illustrating an operating procedure of a signal processing apparatus.

FIG. 5 is a flowchart illustrating a main operating procedure of the signal processing apparatus 14. The procedure shown in FIG. 5 is executed in each detection cycle. First, the signal processing apparatus 14 subjects the beat signal to FFT processing in the up period and the down period of the transmission signal to generate the frequency spectrum thereof, and thereby detects a peak signal (S2). At this time, peak signals that exceed a predetermined level threshold are detected to eliminate the effects of noise. Further, when the electronic scanning method is employed, a peak signal may be detected in each of the reception antennas 12_1, 12_2, . . . , or noise may be smoothed by averaging the beat signals and average peak signals may be detected as the peak signals of the antennae.

The signal processing apparatus 14 then extracts a peak signal representing an important target object in terms of vehicle control from the detected peak signals, as will be described in detail below (S4).

The signal processing apparatus 14 then detects the target object on the basis of the extracted peak signal (S6). At this time, peak signal associations are made between the up period and the down period, and the relative distance and relative velocity of the target object are detected using the respective peak frequencies thereof in accordance with the equations (1) and (2). The signal processing apparatus 14 then outputs a detection result to the vehicle control apparatus 100 (S8).

Next, a peak signal extraction method according to this embodiment will be described.

Figure 6:
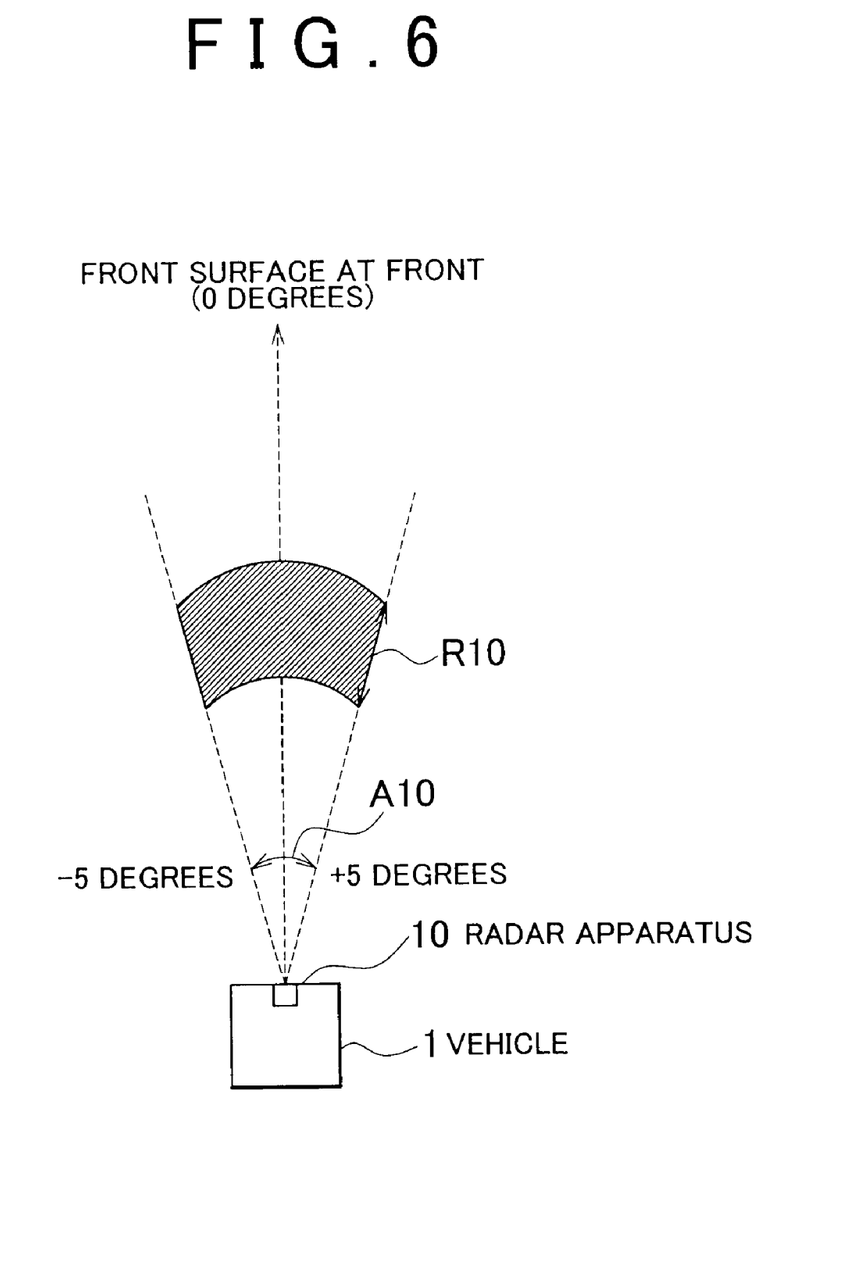
FIG. 6 is a view illustrating an azimuth angle range and a relative distance range having a high level of importance in terms of vehicle control.

FIG. 6 is a view illustrating an azimuth angle range and a relative distance range having a high level of importance in terms of vehicle control. In FIG. 6, an azimuth angle range A10 and a relative distance range R10 are shown as examples. The azimuth angle range A10 is an azimuth angle range of ±5 degrees when the vehicle front surface corresponds to 0 degrees. The relative distance range R10 is a relative distance range of 10 to 50 meters from the vehicle 1. In this embodiment, a target object located within a range (indicated by shading) overlapping the azimuth angle range A10 and the relative distance range R10 shown in FIG. 6, or in other words a target object positioned at a short distance from the vehicle front surface, is considered to be a target object having a high collision probability. When a time required for vehicle control and a time required to approach the target object are taken into consideration, this target object is considered to be the most important target object in terms of vehicle control.

Hence, the peak signal extraction unit 14b extracts the peak signal corresponding to the azimuth angle range A10 and relative distance range R10, and as a result, the target object detection unit 14c detects the most important target object from the peak signal without exception.

As a specific method, first, the azimuth angle detection unit 14a detects the azimuth angle using the detected peak signal. When the mechanical scanning method is employed, the azimuth angle detection unit 14a determines the azimuth angle on the basis of the rotation angle of the antenna unit upon reception of the reception signal from which the peak signal was obtained. When the electronic scanning method is employed, the azimuth angle detection unit 14a determines the azimuth angle on the basis of a phase difference between peak signals having identical peak frequencies among the reception antennae.

The peak signal extraction unit 14b then extracts a peak signal having a peak frequency that is included in a frequency range corresponding to the relative distance range R10 from among the peak signals whose detected azimuth angle is within the azimuth angle range A10. At this time, peak signal extraction is executed on both the up period peak signals and the down period peak signals. Furthermore, when the electronic scanning method is employed, peak signal extraction is executed on both the up period peak signals and the down period peak signals of each reception antenna.

Here, the frequency range corresponding to the relative distance range R10 is determined in advance in the following manner and stored in the ROM of the signal processing apparatus 14. In addition to the relative distance range R10, a relative velocity range (−10 to +10 meters/second, for example) having a high level of importance in terms of vehicle control is specified using the fact that the relative velocity and the relative distance are determined from the up period peak frequency and the down period peak frequency in accordance with the equations (1) and (2). Here, the relative velocity range having a high level of importance in terms of vehicle control is set as a relative velocity range having a certain magnitude (absolute value), taking into consideration the time required for the target object to approach the vehicle 1 upon detection and the time required to control the vehicle 1.

The frequency range of the peak frequency corresponding to the relative distance range and relative velocity range is then calculated in accordance with the following equations (3) to (6). Note that here, R_min and R_max respectively denote a minimum value and a maximum value of the relative distance range R10, while V_min and V_max respectively denote a minimum value and a maximum value of the relative velocity range. Further, the frequency range relating to the peak frequency of the up period is calculated as $\alpha\_min$ to $\alpha\_max$, while the frequency range relating to the peak frequency of the down period is calculated as $\beta\_min$ to $\beta\_max$.

$$\alpha\_min = 4 \times \Delta F \times fm \times R\_min/C + 2 \times f0 \times V\_min/C \quad (3)$$

$$\alpha\_max = 4 \times \Delta F \times fm \times R\_max/C + 2 \times f0 \times V\_max/C \quad (4)$$

$$\beta\_min = 4 \times \Delta F \times fm \times R\_min/C - 2 \times f0 \times V\_min/C \quad (5)$$

$$\beta\_max = 4 \times \Delta F \times fm \times R\_max/C - 2 \times f0 \times V\_max/C \quad (6)$$

Figure 7:
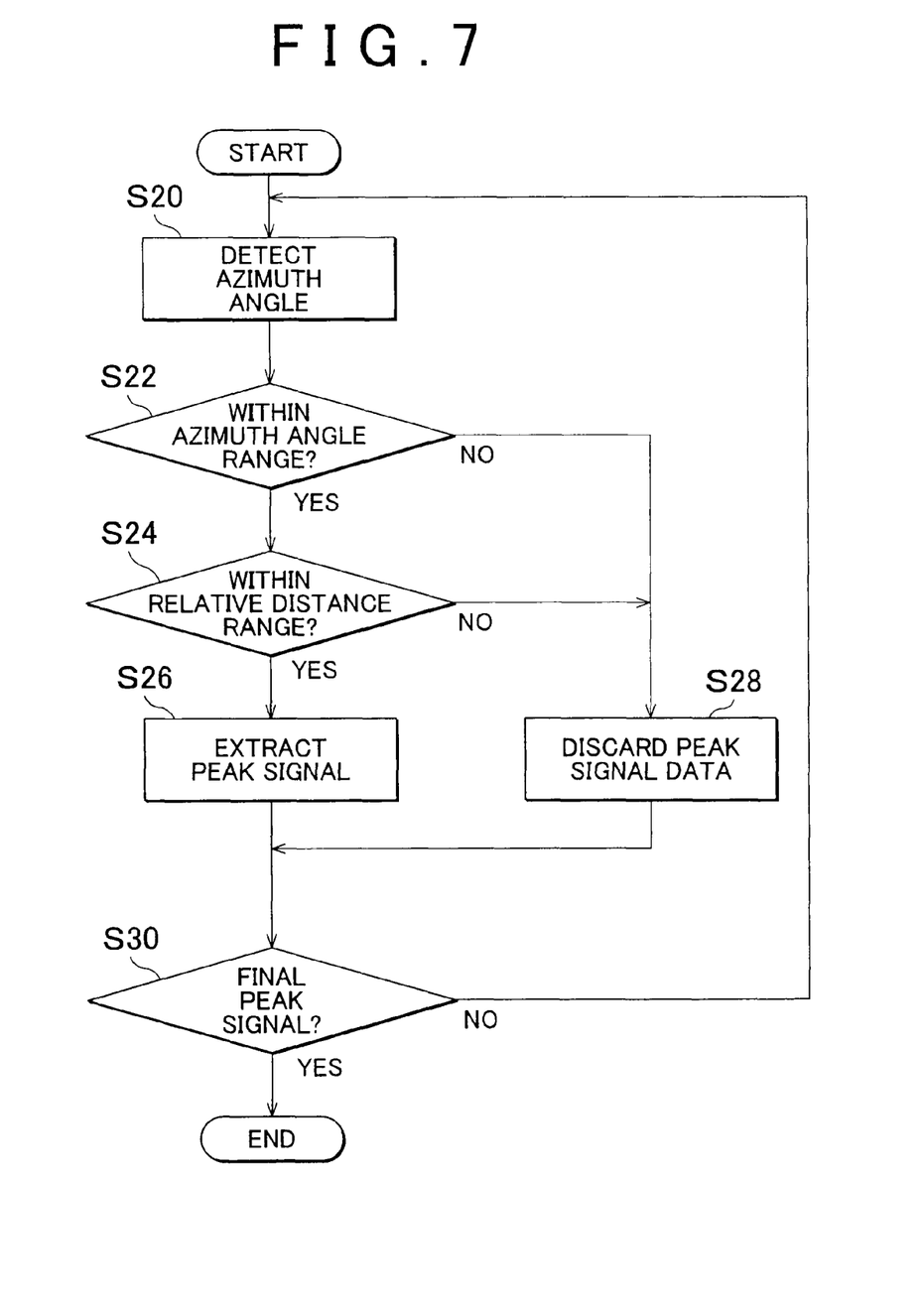
FIG. 7 is a flowchart illustrating in detail a peak signal extraction processing procedure according to this embodiment.

FIG. 7 is a flowchart showing in detail a peak signal extraction processing procedure according to this embodiment. The procedure shown in FIG. 7 corresponds to a sub-routine of step S4 shown in FIG. 5. The procedure of FIG. 7 is executed on all of the up period and down period peak signals extracted in step S2 of FIG. 5.

The azimuth angle detection unit 14a detects the azimuth angles of the target objects respectively represented by all of the peak signals (S20). A determination is then made as to whether or not the azimuth angles detected from the respective peak signals are included in the azimuth angle range A10 (S22). When an azimuth angle is included in the azimuth angle range A10 (YES in S22), a determination is made as to whether or not the peak frequency of the corresponding peak signal is included in the frequency range corresponding to the relative distance range R10, or in other words the frequency range $\alpha\_min$ to $\alpha\_max$ in the case of an up period peak signal and the frequency range $\beta\_min$ to $\beta\_max$ in the case of a down period peak signal (S24). When the peak frequency is included in the frequency range (YES in S24), the corresponding signal is extracted (S26). Note that when the azimuth angle is not included in the azimuth angle range A10 in step S22 (NO in S22) and when the peak frequency is not included in the frequency range in step S24 (NO in S24), the data relating to the peak signal are discarded (S28). When the processing has been performed on all of the peak signals (YES in S30), the processing is terminated.

Through this procedure, the peak signal extraction unit 14b can extract a peak signal representing an important target object in terms of vehicle control without exception. The target object detection unit then performs target object detection on the basis of the extracted peak signal (step S6 in FIG. 5).

According to this embodiment, in the situation shown in FIGS. 1A and 1B, for example, the peak signal P1 can be extracted preferentially by determining that the azimuth angle of the peak signal P1 representing the target object T1 to be prioritized is within the azimuth angle range A10 and the peak frequency al corresponding to the relative distance R1 is within the frequency range $\alpha\_min$ to $\alpha\_max$ (in the case of the up period) or the frequency range $\beta\_min$ to $\beta\_max$ (in the case of the down period). Further, in the situation shown in FIGS. 1C and 1D, the peak signal P1 representing the target object T1 satisfies the above conditions, and since an azimuth angle detected from the peak signal P2 representing the target object T2 is not within the azimuth angle range A10, the peak signal P2 is excluded. Hence, the peak signal P1 can be extracted preferentially.

An example in which a peak signal corresponding to the azimuth angle range A10 and the relative distance range R10 is extracted was described above. In a modified example to be described below, an order of preference is formed by fragmenting a relative distance/relative velocity range constituted by a combination of a relative distance range and a relative velocity range, and a peak signal corresponding to the relative velocity/relative distance range is extracted on the basis of the order of preference of the relative distance/relative velocity range.

Figure 8:
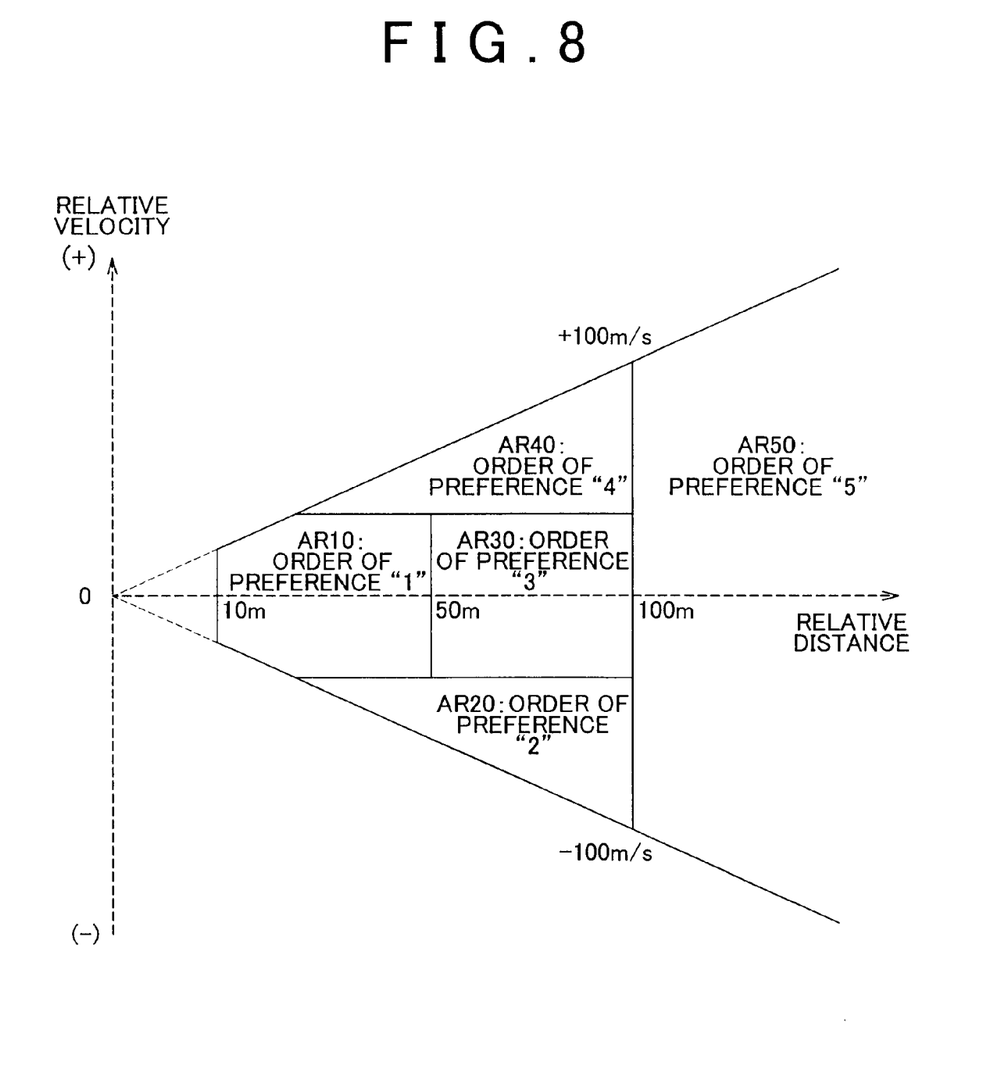
FIG. 8 is a view illustrating an order of preference corresponding to the level of importance in terms of vehicle control in relation to relative distance/relative velocity ranges.

FIG. 8 shows an order of preference corresponding to the level of importance in terms of vehicle control in relation to combined relative distance/relative velocity ranges, in which the abscissa shows the relative distance and the ordinate shows the relative velocity. Here, the collision probability, or in other words the level of importance, is determined to be steadily higher as the relative distance decreases. Therefore, relative distance/relative velocity ranges AR10, AR30, AR50 are prioritized in descending order of relative distance.

Further, in relative distance/relative velocity ranges AR20, AR40 corresponding to the same relative distance range, a negative relative velocity (i.e. the velocity when approaching) is determined to have a greater collision probability, or in other words a higher level of importance, than a positive relative velocity (i.e. the velocity when receding). Therefore, the relative distance/relative velocity range AR20 having a negative relative velocity is prioritized over the relative distance/relative velocity range AR40 having a positive relative velocity.

The relative distance/relative velocity range AR10 has a short distance and a certain degree of relative velocity, and therefore has the highest collision probability. Hence, the relative distance/relative velocity range AR10 is allocated an order of preference "1". An order of preference "2" is allocated to the relative distance/relative velocity range AR20, an order of preference "3" is allocated to the relative distance/relative velocity range AR30, an order of preference "4" is allocated to the relative distance/relative velocity range AR40, and an order of preference "5" is allocated to the relative distance/relative velocity range AR50. Note that shorter relative distances than the relative distance/relative velocity range AR10 are unusable in terms of the timing of vehicle control, and are therefore excluded.

Figure 9A:
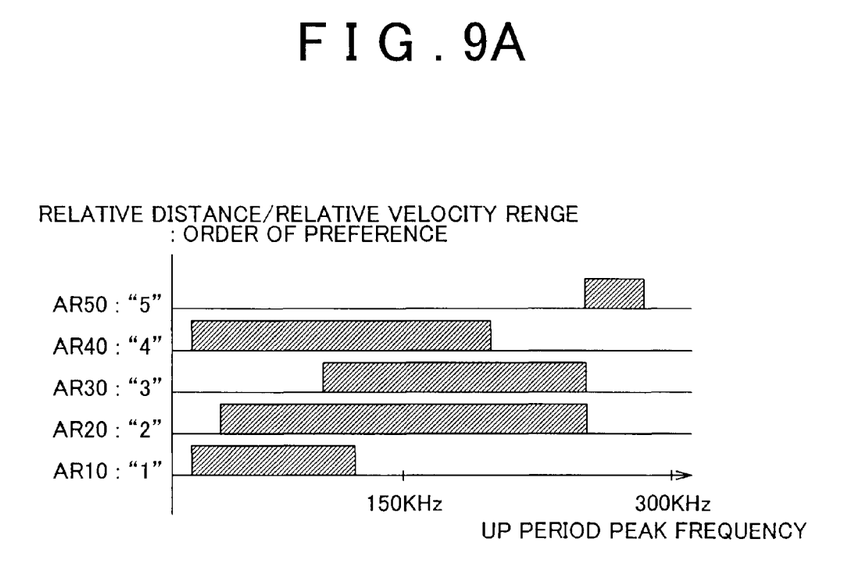
FIGS. 9A and 9B are views showing frequency ranges of peak frequencies corresponding to the relative distance/relative velocity ranges shown in FIG. 8.
Figure 9B:
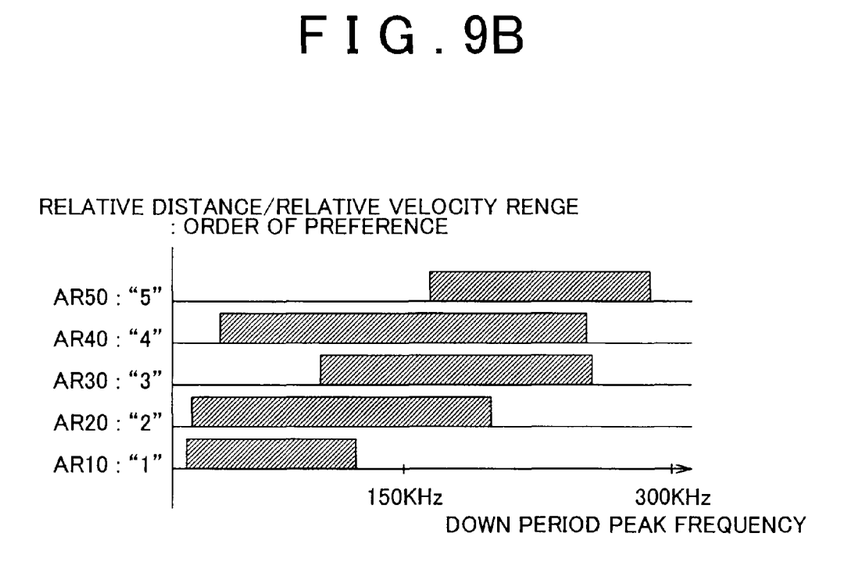

FIG. 9 is a view showing the frequency ranges of the peak frequencies corresponding to the relative distance/relative velocity ranges shown in FIG. 8. FIG. 9A shows the frequency ranges of the peak frequencies corresponding to the relative distance/relative velocity ranges shown in FIG. 8 in relation to the up period peak frequencies, and FIG. 9B shows the frequency ranges of the peak frequencies corresponding to the relative distance/relative velocity ranges shown in FIG. 8 in relation to the down period peak frequencies. The respective frequency ranges shown in FIGS. 9A and 9B are calculated for each of the relative distance/relative velocity ranges shown in FIG. 8 using the maximum value R_max and minimum value R_min of the relative distance and the maximum value V_max and minimum value V_min of the relative velocity in accordance with the equations (3) to (6). The order of preference attached to the corresponding relative distance/relative velocity range is associated with the respective frequency ranges. In this embodiment, relationship data regarding the associations between the frequency range and the order of preference are stored in advance in the ROM of the signal processing apparatus 14.

The frequency ranges shown in FIG. 9 partially overlap, and therefore a plurality of orders of preference may be associated with a single peak frequency. In this case, the highest corresponding order of preference may be used when extracting the peak signal, for example. By using the highest order of preference, a safe determination can be made, and as a result, peak signal detection failure can be avoided.

Figure 10:
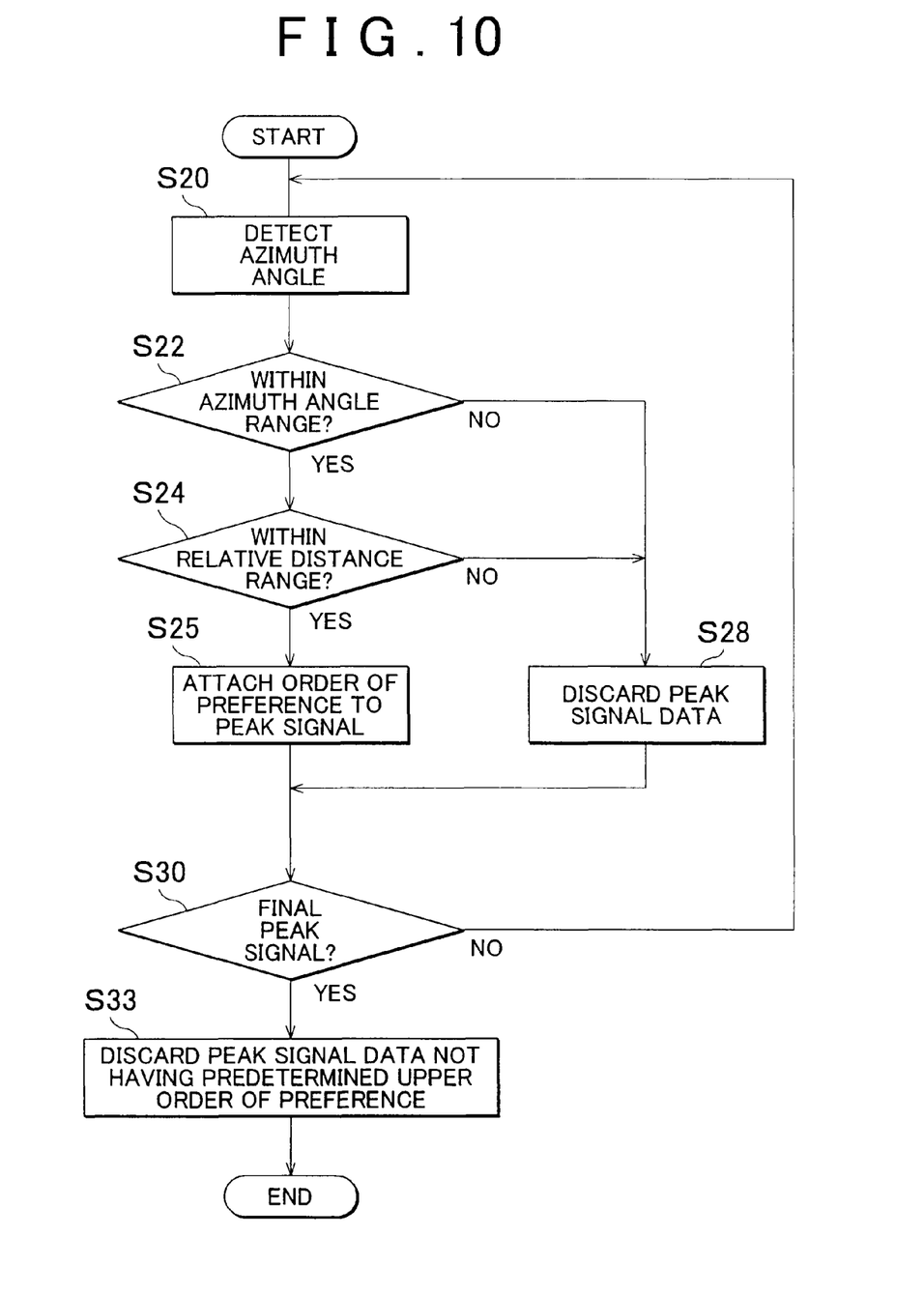
FIG. 10 is a flowchart illustrating an operating procedure used in peak signal extraction processing according to this embodiment.

FIG. 10 is a flowchart showing an operating procedure of the peak signal extraction processing according to this embodiment. Here, in place of step S26 shown in FIG. 7, prioritization is performed on the peak signal on the basis of the order of preference of the frequency range in which the frequency of the peak signal is included (S25).

Peak signals having a predetermined upper order of preference are then extracted on the basis of the order of preference, and data relating to the remaining peak signals are discarded (S33).

Hence, according to this embodiment, a peak signal can be extracted according to the level of importance in terms of vehicle control on the basis of prioritization taking the relative velocity into account.

In the above example, the radar apparatus 10 is used as a radar apparatus for monitoring the front of a vehicle, but the radar apparatus 10 may be installed on a side face of the vehicle 1 and used to monitor the side of the vehicle 1 or installed on a rear portion of the vehicle 1 and used to monitor the rear of the vehicle 1. Alternatively, the radar apparatus 10 may be installed on a front side portion of the vehicle 1 and used to monitor the front side portion of the vehicle 1 or installed on a rear side portion of the vehicle 1 and used to monitor the rear side portion of the vehicle 1.

Further, in the above example, prioritization is performed in relation to the azimuth angle range, relative distance range, and relative velocity range, but prioritization may also be performed in relation to the level of importance in terms of vehicle control.

Moreover, the important azimuth angle range in terms of vehicle control may be set as a range in which the collision probability between the vehicle and the target object is high, for example at an angle for detecting a target object in the same lane as the vehicle.

As described above, according to this embodiment, a peak signal representing a target object located within an azimuth angle range and a relative distance range having a high level of importance in terms of vehicle control can be extracted, and therefore important target objects can be detected without exception.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A signal processing apparatus for a radar transceiver, which receives a reflected signal generated by a target object in response to a frequency modulated transmission signal, and generates a beat signal having a frequency difference between the transmission signal and a reception signal, comprising:

an azimuth angle detection unit that detects an azimuth angle of the target object on the basis of a peak signal in a frequency spectrum of the beat signal;

a storage unit that stores frequencies of the peak signals in association with, an order of preference, wherein, among the frequencies of the peak signals, multiple frequencies based on which the target objects are determined to have the same relative velocity are associated with such an order of preference that the target object of which a relative distance determined based on the corresponding frequency is greater has a lower order of preference, and multiple frequencies based on which the target objects are determined to have the same relative distance are associated with such an order of preference that the target object of which a relative velocity determined based on the corresponding frequency is greater has a lower order of preference;

a peak signal extraction unit that extracts, from among multiple peak signals corresponding to a predetermined azimuth angle range that are associated with the order of preference corresponding to the frequencies of the peak signals, a predetermined number of peak signals having an upper order of preference based on the order of preference, and discards peak signals that are not extracted; and a target object detection unit that detects, based on a pair of the peak signals corresponding to the same target object among the extracted peak signals, the relative distance and relative velocity of the target object.

2. The signal processing apparatus according to claim 1, wherein the peak signal extraction unit extracts a peak signal corresponding to a first relative distance range before extracting a peak signal corresponding to a second relative distance range that is larger than the first relative distance range.

3. The signal processing device according to claim 2, wherein the peak signal extraction unit excludes a peak signal corresponding to a third relative distance range that is smaller than the first relative distance range.

4. The signal processing device according to claim 3, wherein the third relative distance range is outside a plurality of priority zones defined by the order of preference.

5. The signal processing device according to claim 4, wherein priority zones defined by negative relative velocities have a higher priority than priority zones defined by positive relative velocities.

6. The signal processing device according to claim 5, wherein a priority zone defined by the first relative distance range and a predetermined negative velocity has a highest priority.

7. The signal processing device according to claim 2, wherein the peak signal extraction unit prioritizes extraction of a peak signal that corresponds to the predetermined azimuth angle range and a priority zone defined by the first relative distance range and a first predetermined relative velocity range of the target object and the order of preference.

8. The signal processing device according to claim 2, wherein the first relative distance range is between 10 meters and 50 meters from a front of a vehicle that includes the signal processing device, and the second relative distance range is between fifty meters and one hundred meters relative to the front of the vehicle that includes the signal processing device.

9. The signal processing device according to claim 1, wherein the radar transceiver is configured to be capable of varying a directivity of the transmission signal or the reception signal.

10. The signal processing device according to claim 9, wherein the radar transceiver includes a rotation unit to reciprocally rotate an antenna unit that outputs the transmission signal.

11. The signal processing device according to claim 10, wherein the azimuth angle detection unit detects the azimuth angle of the target object on the basis of the peak signal in the frequency spectrum of the beat signal and a rotation angle of the antenna unit.

12. The signal processing device according to claim 9, wherein the radar transceiver includes a plurality of receiving antennas to receive the reflected signal.

13. The signal processing device according to claim 12, wherein the azimuth angle detection unit detects the azimuth angle of the target object on the basis of the peak signal in the frequency spectrum of the beat signal and phase differences of the beat signal among the plurality of receiving antennas.

14. The signal processing device according to claim 13, wherein the beat signals from the plurality of antennas are averaged to remove noise.

15. A radar apparatus comprising the radar transceiver and the signal processing apparatus according to claim 1.

16. A vehicle comprising the radar apparatus according to claim 15.

17. The vehicle according to claim 16, further comprising a vehicle control apparatus that determines a collision probability between the target object and the vehicle on the basis of an azimuth angle, a relative distance, and a relative velocity between the target object and the vehicle.

18. The signal processing device according to claim 1, wherein a frequency of the received signal rises and falls linearly about a predetermined central frequency.

19. The signal processing device according to claim 1, wherein the predetermined azimuth angle range spans ten degrees.

20. A signal processing method for processing, in a signal processing apparatus, a beat signal which is generated in a radar transceiver that receives a reflected signal generated by a target object in response to a frequency modulated transmission signal, and which has a frequency difference between the transmission signal and a reception signal, comprising:

storing frequencies of peak signals in association with an order of preference, wherein, among the frequencies of the peak signals, multiple frequencies based on which the target objects are determined to have a same relative velocity are associated with such an order of preference that the target object of which a relative distance determined based on the corresponding frequency is greater has a lower order of preference, and multiple frequencies based on which the target objects are determined to have a same relative distance are associated with such an order of preference that the target object of which a relative velocity determined based on the corresponding frequency is greater has a lower order of preference, in the signal processing apparatus;

detecting an azimuth angle of the target object on the basis of a peak signal in a frequency spectrum of the beat signal;

extracting, from among multiple peak signals corresponding to a predetermined azimuth angle range that are associated with the order of preference corresponding to the frequencies of the peak signals, a predetermined number of peak signals having an upper order of preference based on the order of preference, and discarding peak signals that are not extracted; and detecting based on a pair of the peak signals corresponding to the same target object among the extracted peak signals, the relative distance and relative velocity of the target object.

* * * * *